US008015165B2

(12) United States Patent
Idicula et al.

(10) Patent No.: US 8,015,165 B2
(45) Date of Patent: Sep. 6, 2011

(54) EFFICIENT PATH-BASED OPERATIONS WHILE SEARCHING ACROSS VERSIONS IN A REPOSITORY

(75) Inventors: Sam Idicula, San Jose, CA (US); Thomas Baby, Foster City, CA (US); Nipun Agarwal, Santa Clara, CA (US); Ravi Murthy, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 269 days.

(21) Appl. No.: 11/304,414

(22) Filed: Dec. 14, 2005

(65) Prior Publication Data

US 2007/0136382 A1 Jun. 14, 2007

(51) Int. Cl.
*G06F 17/30* (2006.01)

(52) U.S. Cl. ........................................ 707/695; 707/806

(58) Field of Classification Search .................. 711/118; 707/4, 2, 1, 101, 203, 3, 695, 638, 999.203, 707/999.003, 806; 705/14; 717/100, 170
See application file for complete search history.

(56) References Cited

U.S. PATENT DOCUMENTS 4,439,837 A 3/1984 Aiena et al.
4,536,873 A 8/1985 Leete
5,088,032 A 2/1992 Bosack
5,313,646 A 5/1994 Hendricks
5,553,216 A 9/1996 Yoshioka et al.
5,678,040 A * 10/1997 Vasudevan et al. .................. 1/1
5,706,510 A 1/1998 Burgoon
5,734,899 A * 3/1998 Yoshizawa et al. .................. 1/1
5,987,506 A 11/1999 Carter et al.
6,085,188 A * 7/2000 Bachmann et al. ............... 707/3
6,279,007 B1 * 8/2001 Uppala ................................ 1/1
6,385,768 B1 * 5/2002 Ziebell .......................... 717/121
6,427,123 B1 * 7/2002 Sedlar ............................... 702/2
6,460,052 B1 * 10/2002 Thomas et al. ............... 707/695
6,587,854 B1 * 7/2003 Guthrie et al. .................... 707/9
6,631,386 B1 * 10/2003 Arun et al. ............................ 1/1
6,658,659 B2 * 12/2003 Hiller et al. ................... 717/170
6,785,769 B1 * 8/2004 Jacobs et al. .................. 711/118

(Continued)

OTHER PUBLICATIONS

Hong-Tai Chou and Won Kim, A Unifying Framework for Version Control in a CAD Environment, Aug. 1986, pp. 336-344.*

(Continued)

*Primary Examiner* — John R. Cottingham
*Assistant Examiner* — Sherief Badawi
(74) *Attorney, Agent, or Firm* — Hickman Palermo Truong & Becker LLP; Daniel D. Ledesma

(57) ABSTRACT

A technique and mechanism for efficiently searching across multiple versions of a resource is provided. New operators are provided that take into account the versions of a particular resource. The query engine evaluates the new operators using either an index-based approach or a functional approach. Under an index-based implementation, a hierarchical index is traversed to find a particular resource (or resources) associated with a specified path and the version history identifier associated with the particular resource(s). A version history table containing references to all versions of the particular resource(s) are then obtained. Under the functional implementation, a link table, which contains all paths in a user's workspace, is examined to determine whether the version history identifier of a particular resource matches a version history identifier of a resource specified in the link table and whether the path to the resource in the link table is related to the path specified.

32 Claims, 6 Drawing Sheets

ERARCHICALLY ORGANIZED REPOSITORY 101

U.S. PATENT DOCUMENTS

| | | | | |
|---|---|---|---|---|
| 6,959,416 | B2 * | 10/2005 | Manning et al. | 715/227 |
| 6,965,903 | B1 * | 11/2005 | Agarwal et al. | 1/1 |
| 7,028,057 | B1 * | 4/2006 | Vasudevan et al. | 707/695 |
| 7,117,216 | B2 * | 10/2006 | Chakraborty et al. | 1/1 |
| 7,139,746 | B2 * | 11/2006 | Shin et al. | 707/736 |
| 7,209,933 | B2 * | 4/2007 | Saxena | 1/1 |
| 7,287,033 | B2 * | 10/2007 | Shadmon et al. | 707/101 |
| 7,305,394 | B2 * | 12/2007 | Fellman | 1/1 |
| 7,472,140 | B2 | 12/2008 | Agarwal et al. | |
| 7,533,136 | B2 | 5/2009 | Idicula et al. | |
| 7,543,004 | B2 | 6/2009 | Idicula et al. | |
| 2002/0143906 | A1 | 10/2002 | Tormasov et al. | |
| 2002/0147634 | A1 * | 10/2002 | Jacoby et al. | 705/14 |
| 2003/0159135 | A1 * | 8/2003 | Hiller et al. | 717/166 |
| 2004/0088306 | A1 * | 5/2004 | Murthy et al. | 707/100 |
| 2004/0205082 | A1 * | 10/2004 | Fontoura et al. | 707/101 |
| 2004/0220912 | A1 | 11/2004 | Manikutty et al. | |
| 2005/0091188 | A1 * | 4/2005 | Pal et al. | 707/1 |
| 2005/0097084 | A1 * | 5/2005 | Balmin et al. | 707/3 |
| 2005/0144198 | A1 * | 6/2005 | Bergstraesser et al. | 707/203 |
| 2005/0198630 | A1 * | 9/2005 | Tamma et al. | 717/175 |
| 2006/0095421 | A1 * | 5/2006 | Nagai et al. | 707/3 |
| 2006/0271606 | A1 * | 11/2006 | Tewksbary | 707/203 |
| 2006/0288056 | A1 * | 12/2006 | Yamakawa et al. | 707/203 |
| 2007/0043715 | A1 * | 2/2007 | Kaushik et al. | 707/4 |
| 2007/0118561 | A1 * | 5/2007 | Idicula et al. | 707/104.1 |
| 2007/0198545 | A1 | 8/2007 | Ge et al. | |
| 2007/0234291 | A1 * | 10/2007 | Ronen et al. | 717/120 |

OTHER PUBLICATIONS

"IETF WEBDAV Working Group World Wide Web Distributed Authoring and Versioning" retrieved on Feb. 22, 2006 from the Internet <URL: http:/ftp.ics.uci.edu/pub/ietf/webdav/> (6 pages).
"Versioning Extensions to WebDAV (Web Distributed Authoring and Versioning)" retrieved on Feb. 22, 2006 from the Internet <URL: http://www.webdav.org/deltav/protocol/rfc3253.html> (110 pages).
Geoff Lee, "Oracle Database 10g Release 2 XML DB Technical Overview" An Oracle White Paper, May 2005, 28 pages, Oracle Corporation, Redwood Shores, California.
Mark Drake, "Oracle Database 10g Release 2 XML DB" An Oracle Technical White Paper, May 2005, 97 pages, Oracle Corporation, Redwood Shores, California.
Mark D. Drake, "Oracle Database 10g Release 2 XML DB & XML DB Repository" Oracle Data Sheet, May 2005, 6 pages, Oracle Corporation, Redwood Shores, California.
"Managing Content with Oracle XML DB", An Oracle White Paper, Mar. 2005, 38 pages, Redwood Shores, California.
Geoff Lee et al., "Mastering XML DB Storage in Oracle Database 10g Release 2" An Oracle White Paper, Mar. 2005, 15 pages, Oracle Corporation, Redwood Shores, California.
Geoff Lee, "Mastering XML DB Repository in Oracle Database 10g Release 2" An Oracle White Paper, Mar. 2005, 15 pages, Redwood Shores, California.
Sean Dillon, "Getting to XML", Oracle Magazine, May/Jun. 2005, 3 pages.
Oracle XML DB Developer's Guide 10g Release 2 (10.2) B14259-02, Aug. 2005, 24 pages.
"Oracle 9i Database Daily Feature", Oracle Technology Network, Jun. 2005, 3 pages.
Bill Beauregard, "Oracle Database 10g Workspace Manager Support for Oracle Spatial Topology Data Model" An Oracle White Paper, May 2005, 7 pages.
Bill Beauregard, "Oracle Database 10g Workspace Manager Overview" An Oracle White Paper, May 2005, 13 pages, Redwood Shores, California.
Bill Beauregard, "Using Oracle Workspace Manager to Cut Costs: Case Studies", Dec. 2003, 36 pages.
"Versioning Extensions to WebDAV (Web Distributed Authoring and Versioning)" retrieved on Feb. 27, 2006 from the Internet <URL: http://www.webdav.org/deltav/protocol/rfc3253.html> (112 pages).
"*WVCM: The Workspace Versioning and Configuration Management API*" retrieved on Feb. 27, 2006 from the Internet <URL: http://www.webdav.org/deltav/wvcm/wvcm-overview.html> (16 pages).
U.S. Appl. No. 11/316,803, filed Dec. 22, 2005, Office Action, Mailing Date May 12, 2008.
U.S. Appl. No. 11/332,117, filed Jan. 12, 2006, Office Action, Mailing Date Dec. 5, 2008.
U.S. Appl. No. 11/316,803, filed Dec. 22, 2005, Notice of Allowance, Mailing Date Jan. 28, 2009.
U.S. Appl. No. 11/332,117, filed Jan. 12, 2006, Notice of Allowance, Mailing Date Jan. 29, 2010.

* cited by examiner

ERARCHICALLY ORGANIZED REPOSITORY 101

HIERARCHICAL INDEX 102

| INDEX ROWID | RES_ID | DIRECTORY ENTRY LIST |
|---|---|---|
| Y1 | r1 | {(a, Y2, r2 ), (b, null, r5 ), (c, Y3, r6 )} |
| Y2 | r2 | {(d.doc, null, r3 , VH1), (e.doc, null, r4 , VH2)} |
| Y3 | r6 | {(f.doc, null, r7 , VH3)} |

112 114 116

VERSION HISTORY TABLE (VH1) 120

| VERSION NAME | RES_ID |
|---|---|
| d.doc | r3 |
| d2.doc | r14 |
| d3.doc | r21 |
| d4.doc | r29 |

LINK TABLE 202

204 206

| TABLE ROWID | PARENT | NAME | VHID | RES_ID | PARENT TABLE ROWID |
|---|---|---|---|---|---|
| T1 | null | / | null | r1 | null |
| T2 | / | a | null | r2 | T1 |
| T3 | / | b | null | r5 | T1 |
| T4 | / | c | null | r6 | T1 |
| T5 | a | d.doc | VH1 | r3 | T2 |
| T6 | a | e.doc | VH2 | r4 | T2 |
| T7 | c | f.doc | VH3 | r7 | T4 |

*FIG. 2*

DISPLAY 512
INPUT DEVICE 514
CURSOR CONTROL 516
MAIN MEMORY 506
ROM 508
STORAGE DEVICE 510
BUS 502
PROCESSOR 504
COMMUNICATION INTERFACE 518
500
NETWORK LINK
520
LOCAL NETWORK 522
HOST 525
INTERNET
ISP
526
528
SERVER 530

EFFICIENT PATH-BASED OPERATIONS WHILE SEARCHING ACROSS VERSIONS IN A REPOSITORY

FIELD OF THE INVENTION

The present invention relates to the versioning of resources and, in particular, to providing efficient operators for searching across multiple versions of resources in a repository.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A database may provide a file repository that can be accessed via a variety of file system-based interfaces, such as those utilizing HTTP/WebDAV (Web Distributed Authoring and Versioning) or NFS (Network File System). Through such interfaces to the repository, a file is located, for example, via its URL or path, and the repository is exposed as a hierarchical set of files and folders (e.g., directories). Further, data-oriented access mechanisms can be used to access a file repository, which expose the repository as a flat set of files that can be queried based on file content or attributes.

Some interfaces, such as repository views, are a combination of data-oriented and navigational access mechanisms. Operators like under_path, which determines whether a path exists to a given file under a specified subtree in the folder hierarchy, may be executed in a data-oriented or navigational way depending on various factors, such as query costs. A similar operator is equals_path, which determines whether a given file is located at the specified path.

VERSIONING

Files in a repository may be versioned. Versioning is an essential feature of a content management repository. It is becoming increasingly important to retain older versions of documents and to query across all versions due to the current regulatory environment, especially in light of the Sarbanes-Oxley Act. Versioning involves a technique for tracking the changes made to a particular file, providing the option to revert to an older version of a particular file, obtaining information on who made each change, and seeing the progression of changes to a particular file. Since each version may need to be indexed and accessed as a separate entity, each version is typically stored in a separate row of a resource table, which contains all versions of all files in the repository. In the context of versioning, “resource” is the term commonly used for the terms “file” and “folder” and is used herein to generally refer to a file or folder.

A version-controlled resource is one whose versions are tracked by the repository. The identity of a resource across its different versions may be referred to as the resource’s version history. An identifier referred to as the version history identifier has the same value for each version of a particular resource and may be associated with each version-controlled resource. There may be several versions of a version-controlled resource corresponding to a single version history.

The decision to search across all versions of a particular resource usually occurs in the context of a workspace. A workspace is essentially a version selector. Thus, a workspace is a collection of version-controlled resources that contains at most one version for a given version history. If a user is working within the context of a workspace and finds an error in a version of a particular resource, then the user may want to query all versions of the particular resource to determine when the error appeared and who is responsible for the error. The problem with such a query is that the search will only identify the version in the user’s workspace. The version in the user’s workspace does not map to any path outside of the user’s workspace.

When data-oriented queries are combined with path-based operators, the user is interested in the paths of all versions of a resource that belong to the same version history as the selected version. For example, if a certain version V1 of version history VH1 satisfies the predicates in a query, and the resources at /a/b/c.xml and /x/y/z.xml are versions of the same resource associated with VH1, then both of these paths need to be associated with V1. The current operators do not consider all versions and only associate a version with a path that points to the version.

Thus, a need exists to provide one or more efficient path-based operators that associate a particular version of a version-controlled resource with all other versions in the same version history so that cross-version queries may be executed.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 illustrates a link table with entries that identify a link between resources in a repository and which includes a version history identifier for each versioned resource, according to an embodiment of the invention;

DETAILED DESCRIPTION

Figures 1A, 1B, 1C:
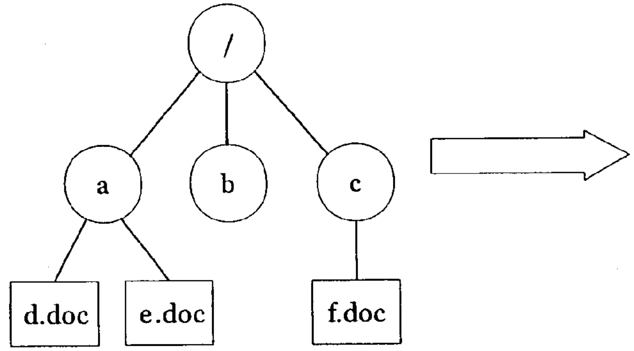
FIG. 1A illustrates a tree-like structure of a hierarchically organized resource repository.
FIG. 1B illustrates a hierarchical index based on the resource repository of FIG. 1A, according to an embodiment of the invention.
FIG. 1C is a version history table that associates all the versions of a particular resource with a corresponding resource identifier that references to a resource table in the resource repository, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are provided for searching across multiple versions of a resource, using new operators. The execution of new operators vcr_under_path and vcr_equals_path associates a version with the paths of all versions of a version-controlled resource in the same version history and vice-versa, i.e., associate a path will all versions in the version history to which the path points. Efficient index-based and functional evaluation techniques are provided for these operators.

In an index-based evaluation of an issued database statement, the path specified in a new operator is used to traverse an index, such as a hierarchical index that exposes a set of resources as a file system. One or more resources referenced in entries of the hierarchical index are identified by traversing the hierarchical index via the specified path. The entry for each identified resource contains a version history identifier that identifies another data structure, such as a table, that stores the resource identifiers of all versions of the same version history as the identified resource. These resource identifiers are then provided to the execution engine for further evaluation.

In a functional-based evaluation of an issued database statement, part of the database statement is already evaluated before the new operator is evaluated. Therefore, the execution engine is given a row from the resource table and then the execution engine evaluates the operator for that particular row. Specifically, the version history identifier from the resource table is provided to the execution engine. A link table contains all the parent-child links in a user's workspace. The link table has a column indicating the version history identifier of a version-controlled resource, which is scanned to locate a row in the link table where the row identifies a resource with the same version history identifier as the version history identifier provided to the execution engine (which was obtained from the resource table). If such a row in the link table is located, the path to the version-controlled resource identified by the row is constructed by scanning the link table again until it is determined whether the constructed path satisfies the path specified in the new operator supplied in the database statement. If the constructed path satisfies the path specified in the database statement, then the row originally obtained from the resource table in previous evaluation steps is used by the execution engine for further processing.

Operating Environment—Storage System

The techniques described herein may be implemented in the context of a database system and, according to one embodiment, are implemented in a database repository that supports versioning of hierarchically organized resources such as a file system-like repository. A database system typically comprises one or more clients that are communicatively coupled to a database server that is connected to a shared database. "Database server" may refer collectively to a cluster of server instances and machines on which the instances execute. Generally, a server is combination of integrated software components and an allocation of computational resources, such as memory, a node, and processes on the node for executing the integrated software components on a processor, where the combination of the software and computational resources are dedicated to providing a particular type of function on behalf of clients of the server.

Among other functions of database management, a database server governs and facilitates access to a particular database, processing requests by clients to access the database. In order for a client to interact with a server, a session is established for the client. A session, such as a database session, is a particular connection established from a client to a server, such as a database server. Through a session, the client can issue a series of requests (e.g., requests for data and/or metadata) to the database server.

A database comprises data and metadata that is stored on a persistent memory mechanism, such as a set of hard disks. Such data and metadata may be stored in a database logically, for example, according to relational and/or object-relational database constructs. Database applications interact with a database server by submitting to the database server commands that cause the database server to perform operations on data stored in a database. A database command that is sent from a database application to a database server contains an original statement of the database command. For the database server to process the commands, the commands must conform to a database language supported by the database server. One non-limiting database language supported by many database servers is known as the Structured Query Language (SQL).

In a database management system (DBMS), data is stored in one or more data containers, each container contains records, and the data within each record is organized into one or more fields. In relational database systems, the data containers are referred to as tables, the records are referred to as rows, and the fields are referred to as columns. In object oriented databases, the data containers are referred to as object classes, the records are referred to as objects, and the fields are referred to as attributes. Other database architectures may use other terminology.

Systems that implement the present invention are not limited to any particular type of data container or database architecture. However, for the purpose of explanation, the examples and the terminology used herein shall be that typically associated with relational databases. Thus, the terms "table", "row" and "column" shall be used herein to refer respectively to the data container, record, and field.

A relational database system may be extended to provide native support for storage, management, and query of (and thus function as a repository for) particular types of data. For example, a traditional relational database system may be augmented with features and technologies to enable storage of XML documents directly in the database, and access to such XML data in either an XML-centric (e.g., using the XQuery query language) or a relational-centric (e.g., using the SQL query language) manner. Such a repository is at times referred to as an XML repository or an XML database (i.e., "XDB").

Index-based Implementation

According to one embodiment, each resource in a hierarchical file system that has any child resources has an index entry in a hierarchical index. A full description of one approach to a hierarchical index may be found in U.S. Pat. No. 6,427,123, entitled HIERARCHICAL INDEXING FOR ACCESSING HIERARCHICALLY ORGANIZED INFORMATION IN A RELATIONAL SYSTEM, the content of which is hereby incorporated by reference in its entirety for all purposes as if fully disclosed herein.

FIG. 1A illustrates a tree-like structure of a hierarchically organized resource repository 101. FIG. 1B illustrates a hierarchical index 102, according to an embodiment of the invention, based on hierarchically organized resource repository 101 in a particular user's workspace. Index entries in hierarchical index 102 are logically linked together in a way that reflects the hierarchical relationship between the resources associated with the index entries. Specifically, if a parent-child relationship exists between the resources associated with two index entries, then the index entry associated with the parent resource contains a reference to the index entry associated with the child resource, such as "Y2" in the first directory entry of a directory entry list 116.

Every row in hierarchical index 102 indicates that there is a parent-child relationship, wherein a resource identifier 114 (res_id) associated with an index entry references the corresponding resource in a resource table, where all versions of all resources may be stored. Directory entry list 116 contains a list of directory entries, wherein each directory entry is a child resource of the parent resource.

The first element in a directory entry in directory entry list 116 is the name of the child resource. The second element indicates an Index rowID 112 of any children the child resource may have. The third element in a directory entry is the res_id that identifies a corresponding resource in the resource table. According to an embodiment, the fourth element, if there is one, indicates the version history identifier (VHID) of the child resource. The fourth element may be an optional element for a directory entry, or every directory entry may be implemented with a fourth element, which may have a "null" value if the resource is not a version-controlled resource.

For example, the first and second rows in hierarchical index 102 indicate that resource "a" is a parent resource of child resources d.doc and e.doc. The "null" next to the name of child resources d.doc and e.doc indicates that neither resource has any children. Also, the directory entry for resources d.doc and e.doc provide their respective res_ids (i.e., r3 and r4) which may be used to directly access the child resources in the resource table. Lastly, the fourth element in the directory entries for resources d.doc and e.doc indicate that both resources are version-controlled resources—d.doc belonging to version history VH1 and e.doc belonging to version history VH2.

Responding to a Query on the Repository with an Index-based Implementation

Figure 3:
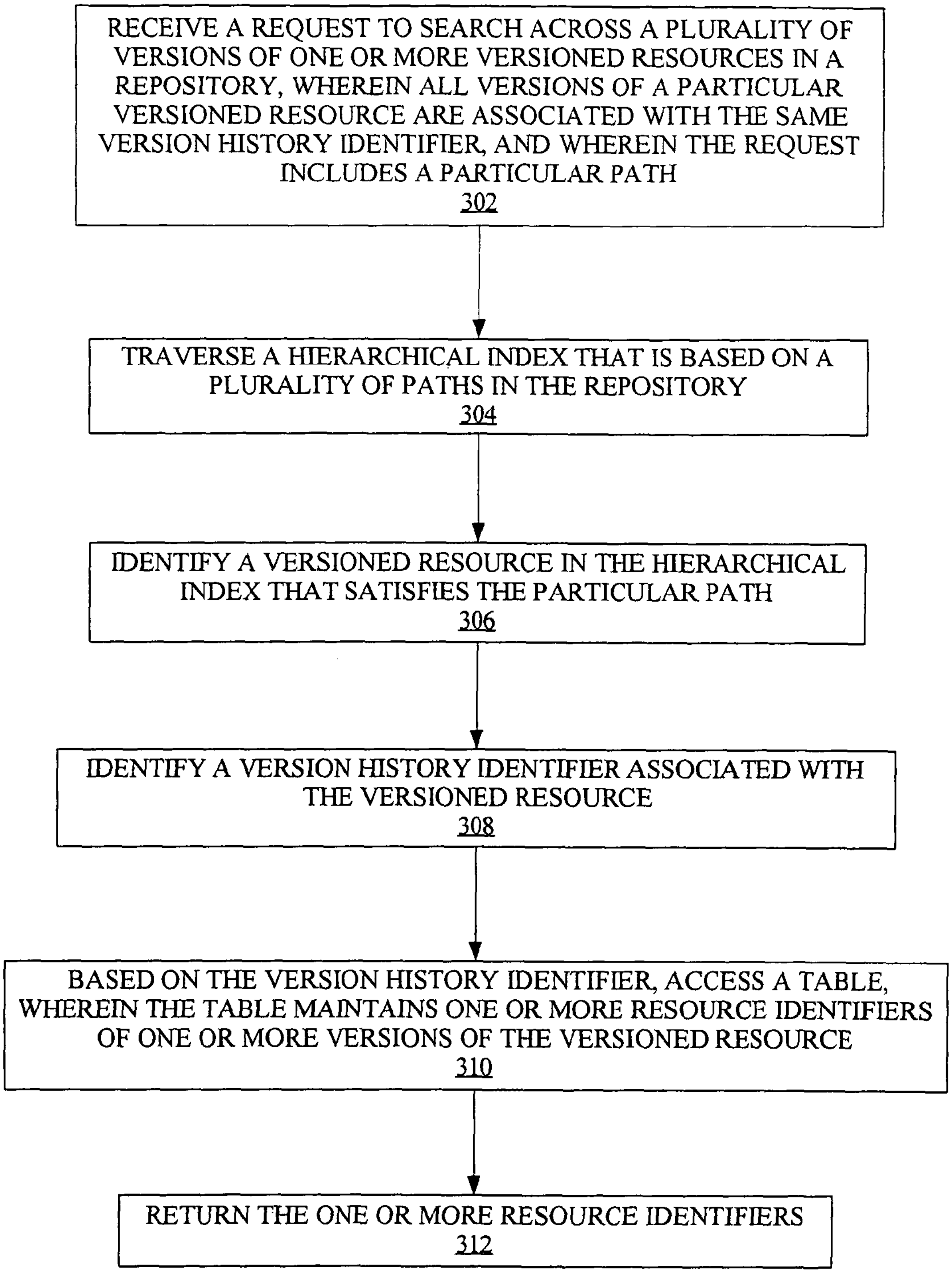
FIG. 3 is a flow diagram that illustrates a process for handling a request, using an index-based approach, to search across versions in a repository that supports versioning of resources, according to an embodiment of the invention.

FIG. 3 is a flow diagram that illustrates a process for handling a request to search across versions in a repository that supports versioning of resources, using an index-based approach, according to an embodiment of the invention. The process illustrated in FIG. 3 is implemented for automated performance by a conventional computing system, such as computer system 500 of FIG. 5. One possible operating environment in which the process of FIG. 3 may be implemented is a database system.

At block 302, a database statement is received from a user, wherein the database statement is a request to search across a plurality of versions of one or more versioned resources in a repository. The request itself includes a path to a resource.

For example, suppose the user issues the following database statement:

```
SELECT res.owner
FROM res_table
WHERE vcr_equals_path (res, '/a/d.doc')
AND age > 52;
```

Hierarchical index 102 is accessed and is traversed using the specified path (i.e., '/a/d.doc') (block 304). This traversal may be performed by, beginning at the first index entry with index rowID Y1, accessing and examining the directory entry list corresponding to index rowID Y1. Examining the first directory entry in the directory entry list, it is determined that 'a' is the child resource of root folder '/'. Because resource 'a' is part of the pathname, the directory entry corresponding to resource 'a' is selected, and the other child resources (i.e., 'b' and 'c') are ignored. Examining the second element in the directory entry corresponding to child resource 'a' indicates that the index rowID 112 of resource 'a' is Y2.

Proceeding directly to the index entry corresponding to index rowID Y2, the directory entry list of that row is examined. The first element in the first directory entry is the name of a child resource of 'a'. The name of this particular child resource of 'a' is 'd.doc'. Because the path constructed by traversing hierarchical index 102 yielding '/a/d.doc' is the same as the path specified in the request, the execution engine has identified a versioned resource that satisfies the specified path (block 306). Depending on the operator (VCR_EQUALS_PATH or VCR_UNDER_PATH) used and the path specified in the operator, the execution engine may identify multiple versioned resources, as described hereafter. ("VCR" in VCR_EQUALS_PATH and VCR_UNDER_PATH stands for "version-controlled resource.")

Returning to the above example with '/a/d.doc' specified as the path, the version history identifier (VHID) associated with versioned resource d.doc is identified (block 308). The VHID is the fourth element in the directory entry for a particular versioned resource. Here, the VHID associated with d.doc is VH1. Based on the version history identifier, a table that maintains a set of one or more resource identifiers (res_ids) corresponding to one or more versions of the versioned resource is accessed (block 310). Here, a version history table 120 (FIG. 1C) is associated with VH1.

Instead of a separate table, the set of res_ids corresponding to a versioned resource may also be maintained as a list in the corresponding directory entry, or in another column in hierarchical index 102. In either case, the set of res_ids is updated whenever a new version is created (e.g., as a result of a check-in operation) or when an existing version is deleted.

Once the res_ids corresponding to the versioned resource, whose path satisfies the specified path, are identified, the set of res_ids are returned to the execution engine for further processing (block 312).

VCR_EQUALS_PATH

Execution of the VCR_EQUALS_PATH operator determines whether a versioned resource can be found in the repository at the path specified as a parameter to the operator. Thus, only one resource at most may be identified because all filenames in a particular directory are unique. Therefore, if a request includes a pathname that uniquely identifies a file in the user's workspace, then the request may use VCR_EQUALS_PATH. In the above example with the path '/a/d.doc' provided in the request, only one resource may satisfy the path specified in the request. Subsequently, all the versions associated with versioned resource d.doc are identified and returned (blocks 310-312).

VCR_UNDER_PATH

If the request specifies a subtree in the user's repository then the request may use the VCR_UNDER_PATH operator. This operator is evaluated to resolve a path to the specified subtree and then to locate all versioned resources "under" the subtree. For example, given hierarchically organized repository 101 of FIG. 1A, if the operator VCR_UNDER_PATH (res, '/a') were part of the issued database statement, then versioned resources d.doc and e.doc and their corresponding VHIDs are identified (block 308). Subsequently, all versions associated with d.doc and e.doc are identified and returned (blocks 310-312).

In summary, by using hierarchical index 102 whose index entries include corresponding VHIDs and are linked, as described above, the process of accessing versioned resources based on their pathnames is significantly accelerated. Hence, multiple versions of a versioned resource are efficiently associated with a specified path, and the number of disk accesses performed during that process is significantly reduced.

Functional Implementation

According to an embodiment, every link in hierarchically organized repository 101 has an entry in a link table. FIG. 2 illustrates a link table 202, wherein each row in link table 202 identifies a link between resources in a repository (e.g., repository 101) and includes a version history identifier 204 for each versioned resource, according to an embodiment of the invention. Thus, link table 202 maintains the relationships, typically only within the particular user's workspace, between folders and the files within the folders.

If a particular resource in link table 202 is a versioned resource, then there may be a VHID associated with the versioned resource. Otherwise, the resource may have a "null" indicating that the resource does not have a version history. A feature of link table 202 is a parent table rowID 206 of a particular resource. Parent table rowID column 206 allows a path, corresponding to a particular resource, to be efficiently constructed by following the references to the parent resources and concatenating the name of the parent resource to the pathname identified thus far. The following flow diagrams and example will illustrate how link table 202 is used to associate a version from the resource table with a path specified in a query.

Responding to a Query on the Repository with a Functional Implementation

Figure 4A:
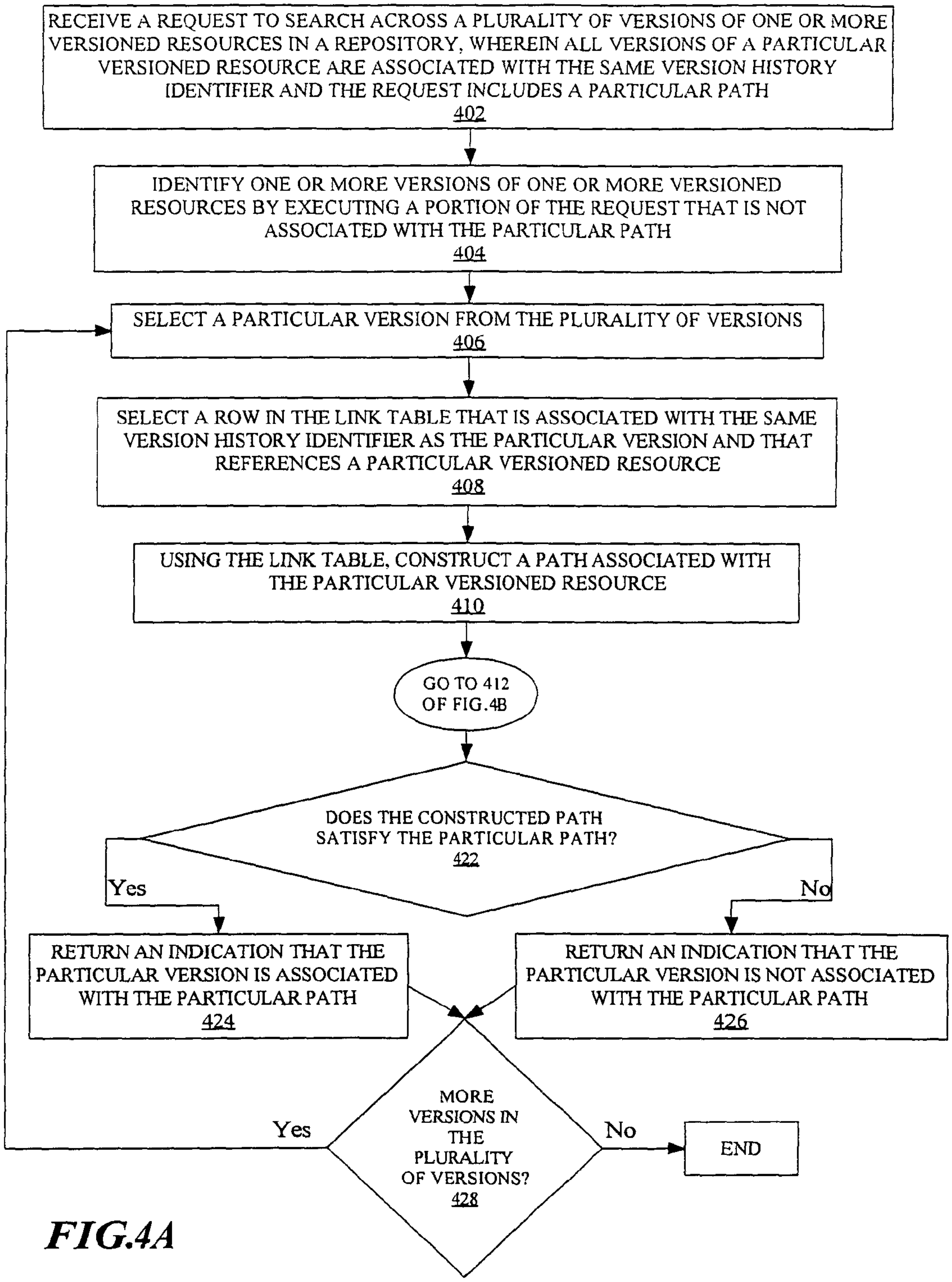
FIGS. 4A and 4B are flow diagrams that illustrate a process for handling a request, using an functional approach, to search across versions in a repository that supports versioning of resources, according to an embodiment of the invention.
Figure 4B:
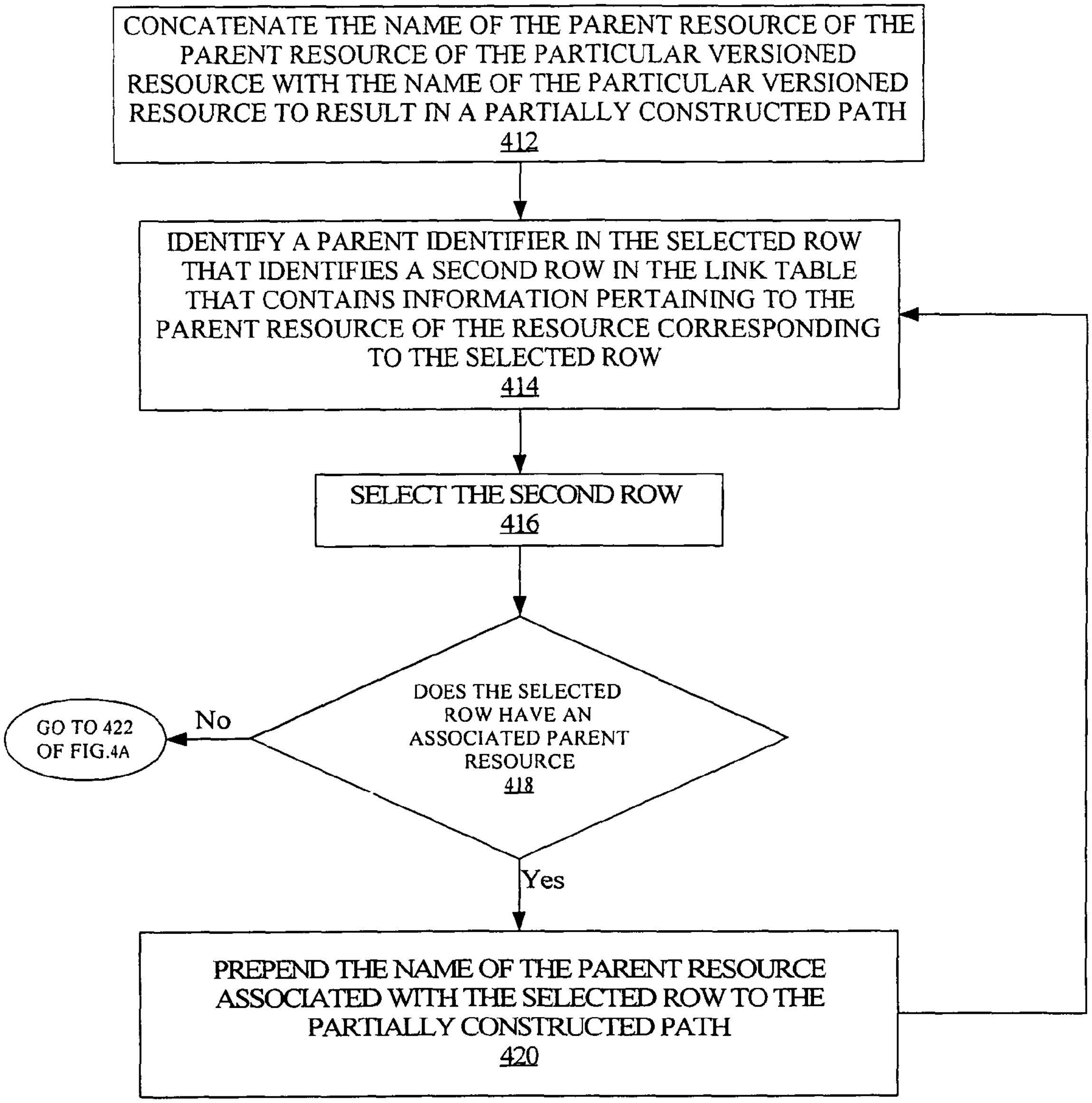

FIGS. 4A and 4B are flow diagrams that illustrate a process for handling a request to search across versions in a repository that supports versioning of resources, using a functional approach, according to an embodiment of the invention. The process illustrated in FIGS. 4A and 4B is implemented for automated performance by a conventional computing system, such as computer system 500 of FIG. 5. One possible operating environment in which the process of FIGS. 4A and 4B may be implemented is a database system.

At block 402, a database statement is received from a user, wherein the database statement is a request to search across a plurality of versions of one or more versioned resources in a repository. The request itself includes a path to a resource.

For example, suppose the user issues the following database statement:

```
SELECT res.owner
FROM res_table
WHERE vcr_equals_path(res, '/a/d.doc')
AND employee_name = 'Idicula';
```

In functional evaluation, the execution engine identifies a plurality of rows (pertaining to one or more versions of one or more versioned resources) in the resource table, by executing a portion of the request that is not associated with the specified path, before a link table is traversed (block 404). The link table is then traversed to determine if the path specified in the request is associated with one or more rows identified in the resource table.

For example, given the database statement above, the execution engine may have accessed an index on employee name to identify one or more versions in the resource table that have the employee name of 'Idicula'. From the one or more versions identified (block 404), a particular version is selected (block 406) to determine if the path specified in the request is associated with the particular version. This step of determining may be performed by the following steps.

Link table 202 is traversed to locate and select a row that is associated with the same VHID as the particular version selected above (block 408). For example, suppose the particular version has a version history identifier of VH3. Link table 202 is scanned to locate and eventually select the row in link table 202 associated with table rowID T7. The resource identified in table rowID T7 is f.doc. Further examination of table rowID T7 indicates that the parent resource of f.doc is 'c' and that information pertaining to resource 'c' may be found at table rowID T4.

Once the row associated with table rowID T7 is selected, the path to f.doc is constructed by "walking back up" link table 202 (block 410). FIG. 4B details the specifics of building the pathname to f.doc. First, the name of parent resource of f.doc (i.e., 'c') is concatenated (block 412) with the name of the particular resource (i.e., f.doc), which results in a partially constructed path (i.e., c/f.doc). Next, a parent identifier (i.e., in parent table rowID column 206) in the selected row is identified, wherein the parent identifier identifies a second row in the link table that contains information pertaining to the parent resource of the resource corresponding to the selected row (block 414). Here, the parent identifier associated with row T7 is T4. Then, the row associated with the parent identifier (i.e., T4) is selected (block 416).

Execution proceeds to decision block 418 where it is determined whether the selected row (i.e., T4) in link table 202 has a parent resource. Because, '/' is the parent resource of 'c', execution proceeds to block 420 where the name of the parent resource (i.e., '/') is prepended to the partially constructed path (i.e., 'c/f.doc') to result in '/c/f.doc'.

Next, execution returns to block 414 where the parent identifier (i.e., T1) of the selected row (i.e., T4) is identified and then selected (block 416). At decision block 418, it is determined whether the selected row (i.e., T1) has an associated parent resource. Because the root folder '/' does not have a parent resource, execution proceeds to block 422 in FIG. 4A.

By implementing the steps in FIG. 4B, the constructed path is then compared to the path specified in the request (block 422). If the constructed path satisfies the specified path [i.e., identical in the case of VCR_EQUALS_PATH, or the versioned resource initially identified in the link table (block 408) is "under" the subtree in the case of VCR_UNDER_PATH] then an indication is returned to the execution engine indicating that the version row identified in the resource table is associated with the specified path (block 424). If the constructed path does not satisfy the specified path, then an indication is returned to the execution engine indicating that the version row identified in the resource table is not associated with the path specified in the request (block 426).

After an indication is generated, if there more versions in the plurality of versions identified in the resource table to be processed (block 428) then execution reverts back to block 406 where another version is selected. Otherwise, the process of associating a version with a path to a different version of the same version history ends.

VCR_EQUALS_PATH

The flow diagrams of FIGS. 4A and 4B should not be used to limit how and when the determination of whether a specified path satisfies a constructed path is performed. For instance, in the case of VCR_EQUALS_PATH, for each version of the plurality of versions, all possible paths are evaluated up to the root folder, while checking at each stage that the link name matches the corresponding link name in the given path. Whenever it is determined that a link name in link table 202 does not match the corresponding link in the given path, execution may proceed directly to block 426 of FIG. 4A. For example, returning to the example database statement illustrated above, it is determined that the VHID of the particular version selected in block 406 is VH3 and that f.doc is associated with VH3 (block 408). Because f.doc does not match d.doc, execution proceeds directly to block 426.

VCR_UNDER_PATH

In the case of VCR_UNDER_PATH, all possible paths of a resource identified in link table 202 (block 408) are considered and the evaluation may end either when the root of the subtree specified in the request is reached (in which case the path is selected) or when the root folder is reached without going through the root of the given subtree (in which case the path is not selected). For example, suppose a path specified in VCR_UNDER_PATH is '/x/y' and VH21 is the version history ID of a particular resource identified in the resource table (blocks 404-406). Further suppose that a row in link table 202 contains an entry for a versioned resource with the same version history ID (i.e., VH21) and the link to the versioned resource is '/m/x/y/z/Sam.doc.' By traversing the link table again, the path constructed (e.g., by prepending the name of the parent resource to the name of the child resource and using parent table rowID column 206) will eventually yield '/x/y/z/Sam.doc.' Once this particular path is constructed, the query engine will determine that the path specified in the operator ('/x/y') matches a substring of the constructed path without having to access the table row identifying the parent resource ('m') of resource 'x'.

Decision to Evaluate Query Using a Functional Approach or an Index-based Approach According to one embodiment, when VCR_EQUALS_PATH is used in a query, an index-based evaluation will be pursued because the full pathname is provided and hierarchical index 102 may be used to go directly to the versioned resource identified by the full pathname. When VCR_UNDER_PATH is used in a query, according to one embodiment, a functional evaluation will be pursued because it is possible that many paths will be found under a specified subtree. Thus, the database system, before the query is executed, will determine whether other parts of the query predicate are very selective. If other parts of the query predicate are highly selective (e.g., employee_name='Idicula' and an index exists on lastname), a functional implementation of VCR_EQUALS_PATH may be chosen that "walks back up" the repository.

Hardware Overview

Figure 5:
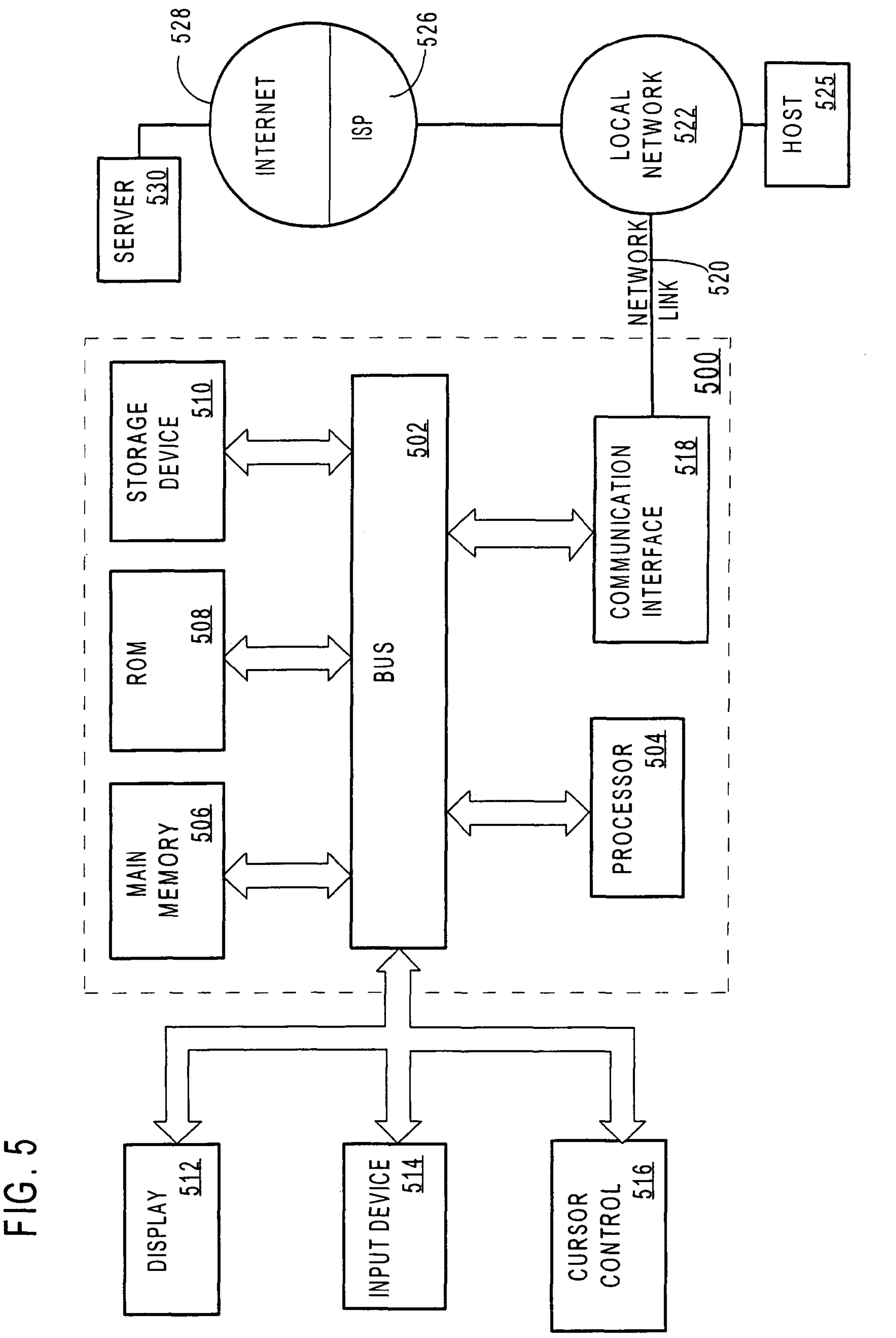
FIG. 5 is a block diagram that illustrates a computer system upon which an embodiment of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including non-volatile media and volatile media. Non-volatile media includes, for example, optical or magnetic disks, such as storage device 510. Volatile media includes dynamic memory, such as main memory 506.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising the steps of:

receiving a database statement that specifies a particular path and one or more conditions relating to either content of one or more resources or metadata associated with the one or more resources; and in response to receiving the database statement:

identifying a first set of versions, of one or more versioned resources, that satisfy the one or more conditions in the database statement;

determining, from among the first set of versions, a second set of one or more versions by determining which versions of the first set of versions are versions of any versioned resource that has any version that satisfies the particular path;

wherein the second set of one or more versions includes a particular version of a particular versioned resource;

wherein a path that identifies a hierarchical location of the particular version does not satisfy the particular path;

wherein a version of the particular versioned resource other than the particular version satisfies the particular path;

generating, based on the second set of one or more versions, a result of the database statement;

wherein the steps are performed on one or more computing devices.

2. The method of claim 1, wherein determining which versions of the first set of versions are versions of any versioned resource that has any version that satisfies the particular path includes:

for each version in the first set of versions, selecting a row in a link table, wherein the row references a versioned resource and the versioned resource is associated with the same version history identifier as said each version;

using the link table, constructing a path, associated with the versioned resource, from child node to parent node, wherein the constructed path comprises a set of nodes; and determining whether the constructed path satisfies the particular path.

3. The method of claim 2, further comprising:

when the constructed path satisfies the particular path, returning an indication that said each version is associated with the particular path; and when the constructed path does not satisfy the particular path, returning an indication that said each version is not associated with the particular path.

4. The method of claim 2, wherein the constructed path satisfies the particular path if the constructed path is the same as the particular path.

5. The method of claim 2, wherein the constructed path satisfies the particular path if the constructed path is within a subtree identified by the particular path.

6. A method comprising the steps of:

receiving a database statement that specifies a particular path and does not specify any version information; and in response to receiving the database statement:

determining that at least a first path, satisfies the particular path, wherein the first path identifies a first hierarchical location in a first hierarchy, determining that a particular version of a particular versioned resource resides at the first hierarchical location, after determining that the particular version resides at the first hierarchical location, searching for other versions of the particular versioned resource, as a result of said searching, identifying a plurality of versions of the particular versioned resource, wherein each of the plurality of versions (a) is different than the particular version and (b) resides at a hierarchical location that is identified by a path that does not satisfy any path specified in the database statement, and generating, based on the plurality of versions, results of the database statement;

wherein the steps are performed on one or more computing devices.

7. The method of claim 6, wherein:

determining that at least the first path satisfies the particular path includes using the particular path to identify, within a particular virtual workspace, the particular version of the particular versioned resource, wherein each version of the plurality of versions is associated with the same version history identifier;

searching for other versions of the particular versioned resource includes:

identifying the version history identifier associated with the particular version, and using the version history identifier of the particular version to identify the plurality of versions, wherein each of the plurality of versions is associated with a different virtual workspace than the particular virtual workspace.

8. The method of claim 7, wherein using the particular path to identify the particular version of the particular versioned resource includes:

traversing a hierarchical index that is based on a plurality of paths in the repository; and identifying a versioned resource, in the hierarchical index, that satisfies the particular path.

9. The method of claim 7, wherein using the version history identifier of the particular version to identify the plurality of versions includes:

identifying a resource identifier for each version of the plurality of versions;

returning each of the identified resource identifiers.

10. The method of claim 7, wherein using the version history identifier of the particular version to identify the plurality of versions includes:

based on the version history identifier, accessing a table, wherein the table maintains a resource identifier for each version of the plurality of versions; and returning each of the resource identifiers.

11. The method of claim 7, wherein the particular path identifies the particular version.

12. The method of claim 7, wherein the particular path identifies the root of a particular subtree in the repository.

13. The method of claim 7, wherein each version of the plurality of versions is identified by a different path.

14. The method of claim 6, wherein:

the first hierarchy corresponds to a first virtual workspace; and the path associated with each version of the plurality of versions identifies a hierarchical location of said each version in a hierarchy that corresponds to a virtual workspace that is different than the first virtual workspace.

15. The method of claim 6, wherein:

the database statement also includes one or more conditions that are different than the particular path;

the method further comprises, after identifying the plurality of versions of the particular versioned resource, determining which versions of the plurality of versions satisfy the one or more other conditions.

16. The method of claim 6, wherein:

determining that the particular version resides at the first hierarchical location includes determining that a first version of each versioned resource of a plurality of versioned resources reside at the first hierarchical location;

searching for other versions of the particular versioned resource includes searching, for each version of each versioned resource of said plurality of versioned resources, for other versions of said each versioned resource;

identifying the plurality of versions of the particular versioned resource includes identifying, for each versioned resource of the plurality of versioned resources, a certain plurality of versions of said each versioned resource, wherein each version of the certain plurality of versions of said each versioned resource (a) is different than said first version of said each versioned resource and (b) resides at a hierarchical location that does not satisfy any path specified in the database statement; and generating results of the database statement includes generating said results based on the certain plurality of versions of each versioned resource of the plurality of versioned resources.

17. One or more storage media storing instructions which, when executed by one or more processors, cause:

receiving a database statement that specifies a particular path and does not specify any version information; and in response to receiving the database statement:

determining that at least a first path, satisfies the particular path, wherein the first path identifies a first hierarchical location a first hierarchy, determining that a particular version of a particular versioned resource resides at a first hierarchical location, after determining that the particular version resides at the first hierarchical location, searching for other versions of the particular versioned resource, as a result of said searching, identifying a plurality of versions of the particular versioned resource, wherein each of the plurality of versions (a) is different than the particular version and (b) resides at a hierarchical location that is identified by a path that does not satisfy any path specified in the database statement, and generating, based on the plurality of versions, results of the database statement.

18. The one or more storage media of claim 17, wherein:

the first hierarchy corresponds to a first virtual workspace; and the path associated with each version of the plurality of versions identifies a hierarchical location of said each version in a hierarchy that corresponds to a virtual workspace that is different than the first virtual workspace.

19. The one or more storage media of claim 17, wherein:

the database statement also includes one or more conditions that are different than the particular path; and the instructions, when executed by the one or more processors, further cause, after identifying the plurality of versions, determining which versions of the one or more versions satisfy the one or more other conditions.

20. The one or more storage media of claim 17, wherein identifying the one or more versions includes:

determining that at least the first path satisfies the particular path includes using the particular path to identify, within a particular virtual workspace, the particular version of the particular versioned resource, wherein each version of the plurality of versions is associated with the same version history identifier;

searching for other versions of the particular versioned resource includes:

identifying the version history identifier associated with the particular version, and using the version history identifier of the particular version to identify the plurality of versions, wherein each of the plurality of versions is associated with a different virtual workspace than the particular virtual workspace.

21. The one or more storage media of claim 20, wherein using the particular path to identify the particular version of the particular versioned resource includes:

traversing a hierarchical index that is based on a plurality of paths in the repository; and identifying a versioned resource, in the hierarchical index, that satisfies the particular path.

22. The one or more storage media of claim 20, wherein using the version history identifier of the particular version to identify the plurality of versions includes:

identifying a resource identifier for each version of the plurality of versions;

returning each of the identified resource identifiers.

23. The one or more storage media of claim 20, wherein using the version history identifier of the particular version to identify the plurality of versions includes:

based on the version history identifier, accessing a table, wherein the table maintains a resource identifier for each version of the plurality of versions; and returning each of the resource identifiers.

24. The one or more storage media of claim 20, wherein the particular path identifies the particular version.

25. The one or more storage media of claim 20, wherein the particular path identifies the root of a particular subtree in the repository.

26. The one or more storage media of claim 20, wherein each version of the plurality of versions is identified by a different path.

27. The one or more storage media of claim 17, wherein:

determining that the particular version resides at the first hierarchical location includes determining that a first version of each versioned resource of a plurality of versioned resources reside at the first hierarchical location;

searching for other versions of the particular versioned resource includes searching, for each version of each versioned resource of said plurality of versioned resources, for other versions of said each versioned resource;

identifying the plurality of versions of the particular versioned resource includes identifying, for each versioned resource of the plurality of versioned resources, a certain plurality of versions of said each versioned resource, wherein each version of the certain plurality of versions of said each versioned resource (a) is different than said first version of said each versioned resource and (b) resides at a hierarchical location that does not satisfy any path specified in the database statement; and generating results of the database statement includes generating said results based on the certain plurality of versions of each versioned resource of the plurality of versioned resources.

28. One or more storage media storing instructions which, when executed by one or more processors, cause:

receiving a database statement that specifies a particular path and one or more conditions relating to either content of one or more resources or metadata associated with the one or more resources; and in response to receiving the database statement:

identifying a first set of versions, of one or more versioned resources, that satisfy the one or more conditions in the database statement;

determining, from among the first set of versions, a second set of one or more versions by determining which versions of the first set of versions are versions of any versioned resource that has any version that satisfies the particular path;

wherein the second set of one or more versions includes a particular version of a particular versioned resource;

wherein a path that identifies a hierarchical location of the particular version does not satisfy the particular path;

wherein a version of the particular versioned resource other than the particular version satisfies the particular path;

generating, based on the second set of one or more versions, a result of the database statement.

29. The one or more storage media of claim 28, wherein determining which versions of the first set of versions are versions of any versioned resource that has any version that satisfies the particular path includes:

for each version in the first set of versions, selecting a row in a link table, wherein the row references a versioned resource and the versioned resource is associated with the same version history identifier as said each version;

using the link table, constructing a path, associated with the versioned resource, from child node to parent node, wherein the constructed path comprises a set of nodes; and determining whether the constructed path satisfies the particular path.

30. The one or more storage media of claim 29, wherein the instructions, when executed by the one or more processors, further cause:

when the constructed path satisfies the particular path, returning an indication that said each version is associated with the particular path; and when the constructed path does not satisfy the particular path, returning an indication that said each version is not associated with the particular path.

31. The one or more storage media of claim 29, wherein the constructed path satisfies the particular path if the constructed path is the same as the particular path.

32. The one or more storage media of claim 29, wherein the constructed path satisfies the particular path if the constructed path is within a subtree identified by the particular path.

* * * * *

UNITED STATES PATENT AND TRADEMARK OFFICE

CERTIFICATE OF CORRECTION

PATENT NO. : 8,015,165 B2
APPLICATION NO. : 11/304414
DATED : September 6, 2011
INVENTOR(S) : Idicula et al.

It is certified that error appears in the above-identified patent and that said Letters Patent is hereby corrected as shown below:

On sheet 1 of 6, in FIG. 1A, Reference Numeral 101, line 1, delete "ERARCHICALLY" and insert -- HIERARCHICALLY --, therefor.

In column 12, line 53, in Claim 6, delete "path," and insert -- path --, therefor.

In column 14, line 23, in Claim 17, delete "path," and insert -- path --, therefor.

In column 14, line 25, in Claim 17, delete "a" and insert -- in a --, therefor.

Signed and Sealed this
Sixth Day of December, 2011

David J. Kappos
*Director of the United States Patent and Trademark Office*